US012668660B2

(12) United States Patent
Kim et al.

(10) Patent No.: US 12,668,660 B2
(45) Date of Patent: Jun. 30, 2026

(54) HIGH STRENGTH BIODEGRADABLE CO-POLYESTER RESIN CONTAINING CYCLIC ALIPHATIC MONOMER AND PREPARING METHOD OF THE SAME

(71) Applicant: RESEARCH & BUSINESS FOUNDATION SUNGKYUNKWAN UNIVERSITY, Suwon-si (KR)

(72) Inventors: Jin Hwan Kim, Seoul (KR); Soo Jung Kang, Anyang-si (KR); Jae Min Jeong, Bucheon-si (KR)

(73) Assignee: RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 517 days.

(21) Appl. No.: 18/135,987

(22) Filed: Apr. 18, 2023

(65) Prior Publication Data

US 2023/0340191 A1 Oct. 26, 2023

(30) Foreign Application Priority Data

Apr. 20, 2022 (KR) ........................ 10-2022-0048819

(51) Int. Cl.

*C08G 63/672* (2006.01)
*C08G 63/85* (2006.01)
*D01F 6/84* (2006.01)

(52) U.S. Cl.

CPC ........... *C08G 63/672* (2013.01); *C08G 63/85* (2013.01); *D01F 6/84* (2013.01); *D10B 2401/12* (2013.01)

(58) Field of Classification Search

None
See application file for complete search history.

(56) References Cited

U.S. PATENT DOCUMENTS

2011/0209747 A1* 9/2011 Shi .......................... B29C 48/08 264/177.17
2020/0087450 A1* 3/2020 Lee ...................... C08G 63/672

FOREIGN PATENT DOCUMENTS

| | | | | |
|---|---|---|---|---|
| CN | 111087588 | A | | 5/2020 |
| CN | 111116883 | A | | 5/2020 |
| CN | 108884215 | B | * | 7/2021 |
| EP | 3184572 | A1 | * | 6/2016 |
| KR | 101404983 | B1 | * | 6/2014 |
| KR | 10-2016-0023973 | A | | 3/2016 |
| KR | 10-2210711 | B1 | | 2/2021 |
| WO | WO 2013/147950 | A1 | * | 10/2013 |

* cited by examiner

*Primary Examiner* — Tae H Yoon
(74) *Attorney, Agent, or Firm* — LEX IP MEISTER, PLLC

(57) ABSTRACT

The present disclosure relates to a co-polyester resin of a composition including dicarboxylic acid, wherein the composition includes $C_{2-5}$ aliphatic diol and isosorbide in an amount of 70 mol to 97.5 mol and 2.5 mol to 30 mol, respectively, based on 100 mol of the dicarboxylic acid, and the dicarboxylic acid includes $C_{2-6}$ aliphatic dicarboxylic acid and cyclic aromatic dicarboxylic acid.

14 Claims, 3 Drawing Sheets

【Fig. 1】
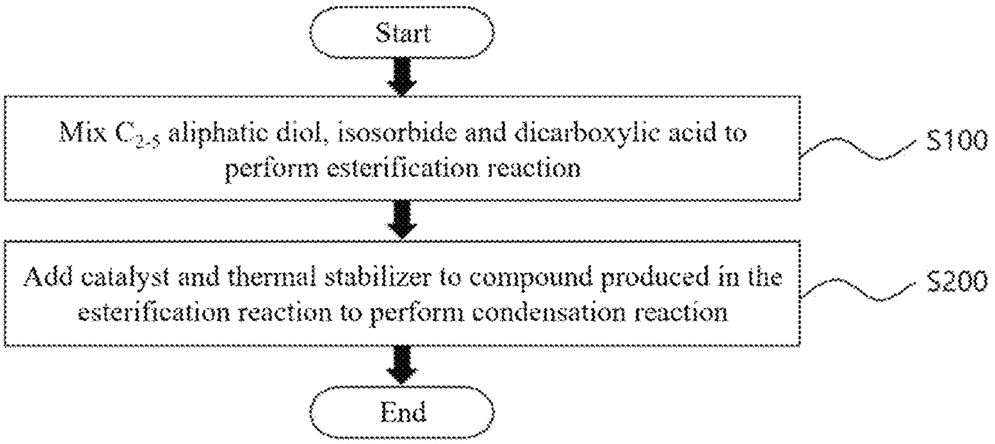

【Fig. 2】
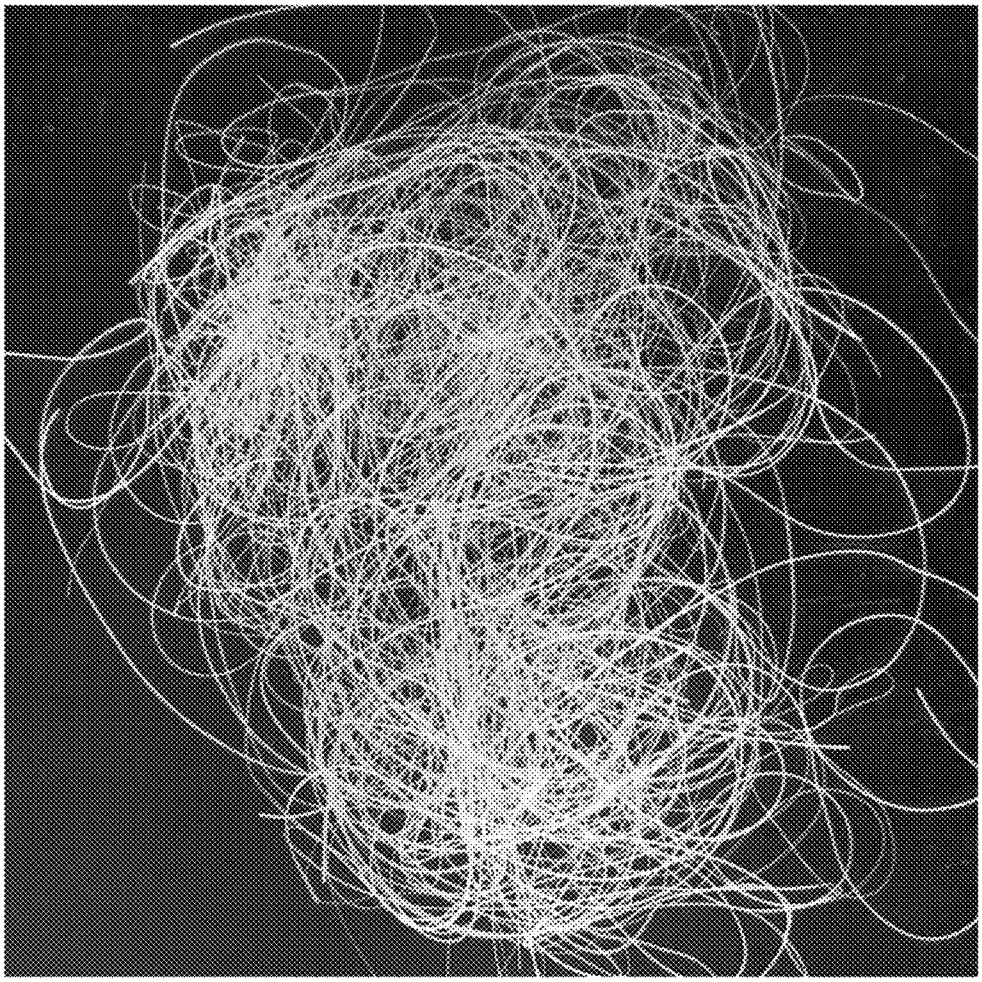

【Fig. 3】
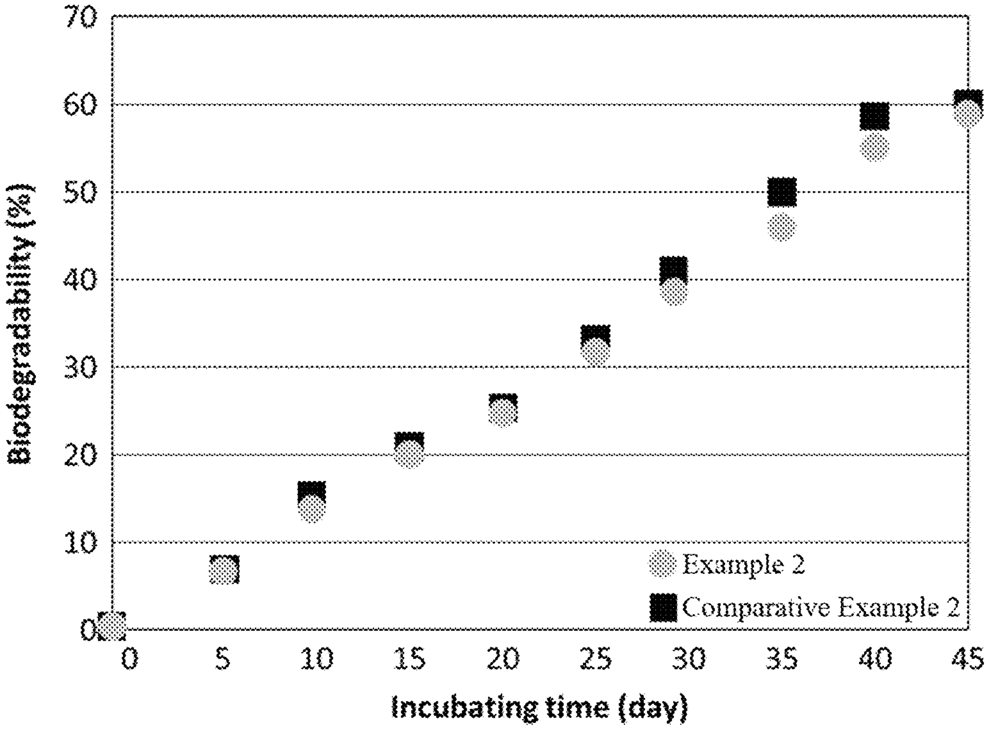

HIGH STRENGTH BIODEGRADABLE CO-POLYESTER RESIN CONTAINING CYCLIC ALIPHATIC MONOMER AND PREPARING METHOD OF THE SAME

CROSS-REFERENCE TO RELATED APPLICATION

This application claims a benefit under 35 U.S.C. § 119(a) of Korean Patent Application No. 10-2022-0048819 filed on Apr. 20, 2022, on the Korean Intellectual Property Office, the entire disclosure of which is incorporated herein by reference for all purposes.

BACKGROUND OF THE INVENTION

1. Field of the Invention

The present disclosure relates to a high strength biodegradable co-polyester resin including a cyclic aliphatic monomer and a preparing method thereof.

2. Description of the Prior Art

Conventional commercialized polymers have high strength and durability with the development of polymer synthesis technology, and are widely used in various fields due to low costs. However, most plastics are products derived from petrochemicals and are not easily decomposed, thus causing environmental problems. By 2050, the cumulative amount of plastic generation is 33 billion tons, out of which 12 billion tons are incinerated, 12 billion tons are landfilled or dumped, and only 9 billion tons are expected to be recycled. In particular, plastic waste is emerging as a major problem not only on the ground but also in the ocean, and according to Nature Science journal, it has been found that the second and third places in the world, which are most contaminated with microplastics, are downstream of Incheon and Nakdonggang River, respectively, and thus Korea currently has the world's most contaminated coast.

Environmental pollution caused by waste plastics and microplastics is getting worse worldwide, thus strengthening regulations on the use of disposable plastic products. To solve this environmental problem, about 30 global companies around the world have formed a "plastic waste removal union" to promote solutions for reducing and removing marine waste plastics. As such, the replacement of plastics with eco-friendly materials is being made worldwide, and the replacement of plastics with eco-friendly materials is an essential task for Korean companies to respond to regulations according to these environmental problems.

Meanwhile, in order to solve the problem of treating plastics which are not easily decomposed, polymers having biodegradability such as poly(butylene succinate) (PBS), poly-butylene adipate terephthalate (PBAT), poly butylene succinate-co-adipate-co-terephthalate (PBSAT), poly(lactic acid) (PLA), and the like have been developed, but the PBS and PLA have relatively high strength, but are easily breakable due to brittleness compared to other biodegradable polymers. Thus, there is a limitation in application fields such as films, fibers, and the like, and there is a problem in that the PBAT and PBSAT have high elongation but low strength, and thus are not used in application fields such as fishing net, fishing gear, and the like, requiring high-strength physical properties.

Thus, there is a need to develop a polymer material having improved strength and durability and maintained biodegradability.

Korean Registered Patent No. 10-1258086, which is a background technology of the present disclosure, relates to a method for preparing a biodegradable polymer material, a biodegradable polymer material, and a product for fixing bone tissue prepared by using the same. The above patent discloses a biodegradable polymer, which includes a cyclic ester monomer having chiral carbon, is biodegradable and has high strength, is disclosed, but does not mention a biodegradable polymer having improved strength by using isosorbide.

SUMMARY OF THE INVENTION

To solve the problems in the related art as described above, the present disclosure may provide a biodegradable co-polyester resin having high strength.

In addition, the present disclosure may provide a method for preparing the co-polyester resin.

Furthermore, the present disclosure may provide a biodegradable film including the co-polyester resin.

Moreover, the present disclosure may provide a polyester fiber including the co-polyester resin.

However, the technical objects to be achieved by embodiments of the present disclosure are not limited to those mentioned above, and other technical objects may exist.

In order to accomplish the above technical problems, a first aspect of the present disclosure may provide a co-polyester resin of a composition including dicarboxylic acid, in which the composition includes $C_{2-5}$ aliphatic diol and isosorbide in an amount of 70 mol to 97.5 mol and 2.5 mol to 30 mol, respectively, based on 100 mol of the dicarboxylic acid, and the dicarboxylic acid includes $C_{2-6}$ aliphatic dicarboxylic acid and cyclic aromatic dicarboxylic acid.

According to one embodiment of the present disclosure, the co-polyester resin may include a compound represented by formula 1 below, but is not limited thereto:

[Formula 1]

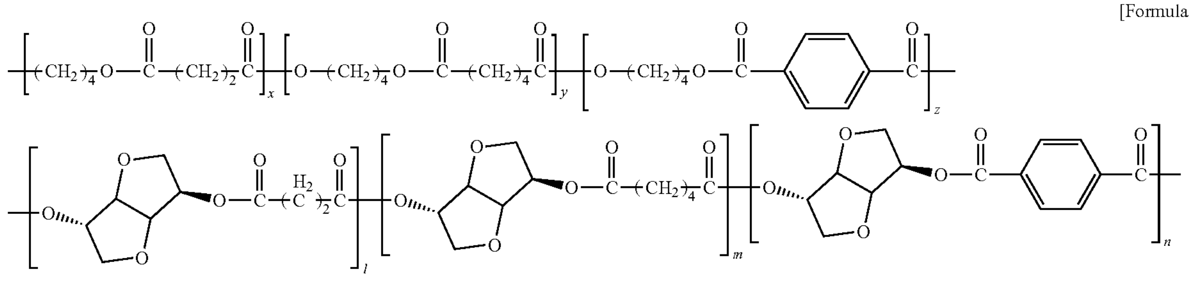

(wherein in above formula 1, x is 49 to 95, y is 2.5 to 21, and z is 2.5 to 21, l is 2.5 to 21, m is 0.05 to 9, and n is 0.05 to 9, and a sum of x, y, z, l, m, and n is 100).

According to one embodiment of the present disclosure, biodegradability may be increased as a content of the $C_{2-5}$ aliphatic diol and/or the $C_{2-6}$ aliphatic dicarboxylic acid is increased, but is not limited thereto.

According to one embodiment of the present disclosure, mechanical strength may be increased as a content of the isosorbide and/or the cyclic aromatic dicarboxylic acid is increased, but is not limited thereto.

According to one embodiment of the present disclosure, the dicarboxylic acid may include the $C_{2-6}$ aliphatic dicarboxylic acid and the cyclic aromatic dicarboxylic acid at a molar ratio of 70:2.5 to 97.5:30, but is not limited thereto.

According to one embodiment of the present disclosure, the $C_{2-6}$ aliphatic dicarboxylic acid may be selected from the group consisting of succinic acid, adipic acid, and combinations thereof, but is not limited thereto.

According to one embodiment of the present disclosure, the cyclic aromatic dicarboxylic acid may be selected from the group consisting of terephthalic acid, phthalic acid, isophthalic acid, t-butyl isophthalic acid, 2,6-naphthalenedicarboxylic acid, 4,4'-biphenyldicarboxylic acid, and combinations thereof, but is not limited thereto.

According to one embodiment of the present disclosure, the $C_{2-5}$ aliphatic diol may be selected from the group consisting of 1,4-butanediol, ethylene glycol, 1,2-propanediol, 1,3-propanediol, 1,5-pentanediol, neopentyl glycol, and combinations thereof, but is not limited thereto.

In addition, a second aspect of the present disclosure may provide a method for preparing a co-polyester resin, the method including: mixing $C_{2-5}$ aliphatic diol, isosorbide and dicarboxylic acid to perform an esterification reaction; and adding a catalyst and a thermal stabilizer to a compound produced in the esterification reaction to perform a condensation reaction.

According to one embodiment of the present disclosure, the co-polyester resin may include a compound represented by formula 1 below, but is not limited thereto:

According to one embodiment of the present disclosure, the esterification reaction may be performed in a pressure range of 1.5 atm to 2.5 atm, but is not be limited thereto.

According to one embodiment of the present disclosure, the esterification reaction may be performed in a temperature range of 180° C. to 210° C., but is not be limited thereto.

According to one embodiment of the present disclosure, the condensation reaction may be performed in a pressure range of 0.5 torr to 1 torr, but is not be limited thereto.

According to one embodiment of the present disclosure, the condensation reaction may be performed in a temperature range of 230° C. to 260° C., but is not be limited thereto.

In addition, a third aspect of the present disclosure may provide a biodegradable film including the co-polyester resin according to the first aspect of the present disclosure.

Furthermore, a fourth aspect of the present disclosure may provide a polyester fiber including the co-polyester resin according to the first aspect of the present disclosure.

The above-described means for solving the problem are merely illustrative and should not be interpreted as an intention to limit the present disclosure. In addition to the above-described exemplary embodiments, there may be an additional embodiment in the drawings and the detailed description.

The co-polyester resin according to the present disclosure is a novel polymer resin which maintains strength and durability higher than those of existing biodegradable plastics during a period of use, and bio-degrades after the period of use or when is discarded, thus causing no environmental problems. Specifically, in order to improve strength, the resin has been prepared by using isosorbide and cyclic aromatic dicarboxylic acid, which are cyclic monomers, and using aliphatic diol and aliphatic dicarboxylic acid, which are biodegradable monomers.

In addition, the co-polyester resin according to the present disclosure is a co-polyester resin prepared by controlling the ratio of a cyclic monomer capable of increasing strength and a monomer having biodegradability, thus having an optimum effect to the extent of not losing advantages of both. Specifically, as the ratio of the isosorbide and the cyclic aromatic dicarboxylic acid in the copolymer is increased,

[Formula 1]

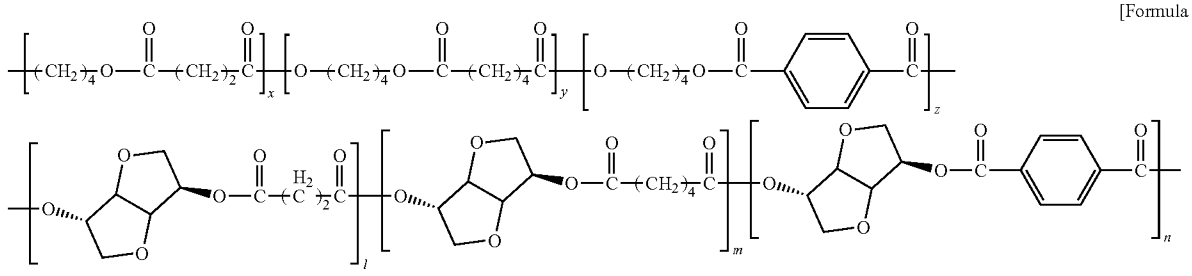

(wherein in above formula 1, x is 49 to 95, y is 2.5 to 21, and z is 2.5 to 21, l is 2.5 to 21, m is 0.05 to 9, and n is 0.05 to 9, and a sum of x, y, z, l, m, and n is 100).

According to one embodiment of the present disclosure, the catalyst may include titanium alkoxide, but is not be limited thereto.

According to one embodiment of the present disclosure, the thermal stabilizer may be selected from the group consisting of phosphorous acid, phosphoric acid, phosphorous ester, phosphate ester, and combinations thereof, but is not limited thereto.

there is an advantage of improving strength, but the biodegradability is deteriorated, whereas as the ratio of the aliphatic diol and the aliphatic dicarboxylic acid is increased, the biodegradability is increased, but the strength is deteriorated. Thus, a monomer related to strength and a monomer related to biodegradability have a trade-off relationship, and thus when a specific ratio is not adjusted, a degree of crystallinity is decreased and the strength is decreased. Considering the above, the co-polyester resin according to the present disclosure is a co-polyester resin, which is prepared at an optimum synthesis ratio, thus being capable of biodegradation and having high strength.

In addition, the co-polyester resin according to the present disclosure can be used as a complete biomass plastic since all the monomers used therein can be extracted from biomass such as sugar cane, sugar beet, corn, potato, grain, vegetable oil and the like and have biodegradability.

However, the effects obtainable from the present disclosure are not limited to the above-described effects, and other effects may exist.

BRIEF DESCRIPTION OF THE DRAWINGS

FIG. 1 is a flowchart of a method for preparing a co-polyester resin according to one embodiment of the present disclosure.

FIG. 2 is an image of a co-polyester resin prepared according to one embodiment of the present disclosure.

FIG. 3 is a graph for describing biodegradability of a co-polyester resin prepared according to one embodiment of the present disclosure.

DETAILED DESCRIPTION OF THE INVENTION

Hereinafter, the embodiments of the present disclosure will be described in detail such that those skilled in the art to which the present disclosure pertains may easily carry out with reference to the accompanying drawings. However, the present disclosure may be implemented in various different forms and is not limited to the embodiments described herein. In order to clearly describe the present disclosure in the drawings, parts not related to the description are omitted, and the similar reference numerals are assigned to the similar parts throughout the specifications.

Throughout the specification, when a part is referred to as being "connected" to another part, this includes not only a case where the part is "directly connected" but also "electrically connected" with intervening elements present.

Throughout the present specification, when a member is positioned "on," "at an upper part of," "at an upper end of," "under," "at a lower part of," "at an upper end of" another member, this includes not only a case where the member is in contact with the other member but also a case where another member exists between the two members.

Throughout the present specification, when a part is said to "include" a component, it is not meant to exclude other components, but meant to further include other components as well, unless otherwise especially specified.

The terms "about", "substantially", etc., to the extent used herein are used as a very numerical value or a meaning close thereto when manufacturing and material tolerances inherent in the stated meaning are presented, and are used to prevent an unconscientious infringer from unfairly using the disclosure in which an accurate or absolute value is stated, to aid understanding of the present disclosure. In addition, throughout the present specification, the term "step of doing" or "step of" does not mean "step for".

Throughout the present specification, the term "combination thereof" included in the expression of the Markush format means a mixture or combination of one or more selected from the group consisting of the elements described in the expression of the Markush format, and means including one or more selected from the group consisting of the elements.

Throughout the present specification, the description of "A and/or B" means "A, B, or A and B".

Hereinafter, a co-polyester resin of the present disclosure and a method for preparing the same will be described in detail with reference to embodiments, examples and drawings.

However, the present disclosure is not limited to these embodiments, examples and drawings.

In order to accomplish the above technical objects, a first aspect of the present disclosure may provide a co-polyester resin of a composition including dicarboxylic acid, in which the composition includes $C_{2-5}$ aliphatic diol and isosorbide in an amount of 70 mol to 97.5 mol and 2.5 mol to 30 mol, respectively, based on 100 mol of the dicarboxylic acid, and the dicarboxylic acid includes $C_{2-6}$ aliphatic dicarboxylic acid and cyclic aromatic dicarboxylic acid.

The co-polyester resin according to the present disclosure may be a novel polymer resin which maintains strength and durability higher than those of existing biodegradable plastics during a period of use, and bio-degrades after the period of use or when is discarded, thus causing no environmental problems. Specifically, in order to improve strength, the resin has been prepared by using isosorbide and cyclic aromatic dicarboxylic acid, which are cyclic monomers, and using aliphatic diol and aliphatic dicarboxylic acid, which are biodegradable monomers.

In addition, the co-polyester resin according to the present disclosure is a co-polyester resin prepared by controlling the ratio of a cyclic monomer capable of increasing strength and a monomer having biodegradability, thus having an optimum effect to the extent of not losing advantages of both. Specifically, as the ratio of the isosorbide and the cyclic aromatic dicarboxylic acid in the copolymer is increased, there may be an advantage of improving strength, but the biodegradability may be deteriorated, whereas as the ratio of the aliphatic diol and the aliphatic dicarboxylic acid is increased, the biodegradability may be increased, but the strength may be deteriorated. Thus, a monomer related to strength and a monomer related to biodegradability have a trade-off relationship, and thus when a specific ratio is not adjusted, a degree of crystallinity may be decreased and thus the strength may be decreased. Considering the above, the co-polyester resin according to the present disclosure is a co-polyester resin, which is prepared at an optimum synthesis ratio, thus being capable of biodegradation and having high strength.

In addition, the co-polyester resin according to the present disclosure can be used as a complete biomass plastic since all the monomers can be extracted from biomass such as sugar cane, sugar beet, corn, potato, grain, vegetable oil and the like and have biodegradability.

According to one embodiment of the present disclosure, the co-polyester resin may include a compound represented by formula 1 below, but is not limited thereto:

[Formula 1]

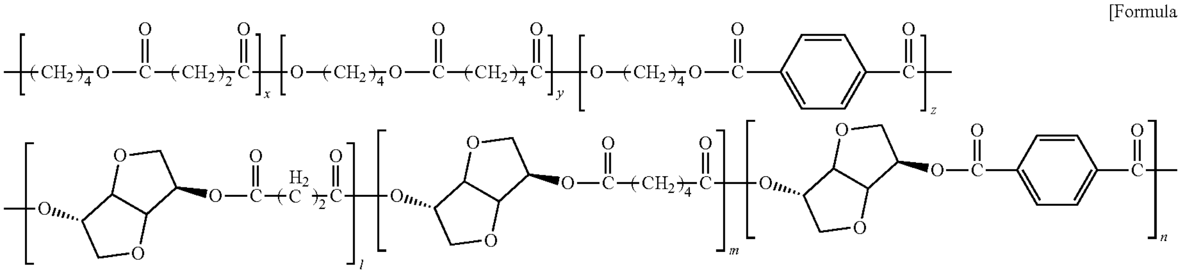

(wherein in above formula 1, x is 49 to 95, y is 2.5 to 21, and z is 2.5 to 21, l is 2.5 to 21, m is 0.05 to 9, and n is 0.05 to 9, and sum of x, y, z, l, m, and n is 100).

As will be described later, in above formula 1, a cyclic structure may be a part related to strength, and a chain structure may be a part related to biodegradation. Respective structures may have a trade-off relationship, and when a cyclic structure increases, strength may increase, but biodegradability may decrease, and when a chain structure increases, biodegradability may increase, but strength may decrease. Thus, in above formula 1, an appropriate ratio of x, y, z, l, m, and n should be set to prepare the co-polyester resin having excellent strength and biodegradability.

According to one embodiment of the present disclosure, the dicarboxylic acid may include the $C_{2-6}$ aliphatic dicarboxylic acid and the cyclic aromatic dicarboxylic acid at a molar ratio of 70:2.5 to 97.5:30, but is not limited thereto.

The $C_{2-6}$ aliphatic dicarboxylic acid may be a biodegradable monomer, and the cyclic aromatic dicarboxylic acid may be a monomer related to strength. As the ratio of the $C_{2-6}$ aliphatic dicarboxylic acid is increased, the biodegradability may be improved but the strength may be decreased, and as the ratio of the cyclic aromatic dicarboxylic acid is increased, the strength may be improved but the biodegradability may be decreased. Thus, it may be preferable that the dicarboxylic acid is included at a molar ratio of 70:2.5 to 97.5:30.

According to one embodiment of the present disclosure, the $C_{2-6}$ aliphatic dicarboxylic acid may be selected from the group consisting of succinic acid, adipic acid, and combinations thereof, but is not limited thereto.

According to one embodiment of the present disclosure, the cyclic aromatic dicarboxylic acid may be selected from the group consisting of terephthalic acid, phthalic acid, isophthalic acid, t-butyl isophthalic acid, 2,6-naphthalenedicarboxylic acid, 4,4'-biphenyldicarboxylic acid, and combinations thereof, but is not limited thereto.

According to one embodiment of the present disclosure, biodegradability may be increased as a content of the $C_{2-5}$ aliphatic diol and/or the $C_{2-6}$ aliphatic dicarboxylic acid is increased, but is not limited thereto.

The $C_{2-5}$ aliphatic diol and/or the $C_{2-6}$ aliphatic dicarboxylic acid may be a biodegradable monomer having a chain structure, and as the ratio of the $C_{2-5}$ aliphatic diol and/or the $C_{2-6}$ aliphatic dicarboxylic acid in the copolymer is increased, the biodegradability may be improved while the mechanical strength may be deteriorated.

According to one embodiment of the present disclosure, the $C_{2-5}$ aliphatic diol may be selected from the group consisting of 1,4-butanediol, ethylene glycol, 1,2-propanediol, 1,3-propanediol, 1,5-pentanediol, neopentyl glycol, and combinations thereof, but is not limited thereto.

According to one embodiment of the present disclosure, mechanical strength may be increased as a content of the isosorbide and/or the cyclic aromatic dicarboxylic acid is increased, but is not limited thereto.

The isosorbide and the cyclic aromatic dicarboxylic acid may be monomers related to mechanical strength, and as the ratio of the isosorbide and the cyclic aromatic dicarboxylic acid in the copolymer is increased, the mechanical strength may be improved while biodegradability may be reduced.

Accordingly, it may be necessary to prepare a co-polyester resin having excellent strength and biodegradability by setting an appropriate ratio of the $C_{2-5}$ aliphatic diol and the $C_{2-6}$ aliphatic dicarboxylic acid, which are monomers related to biodegradability, and the isosorbide and the cyclic aromatic dicarboxylic acid, which are monomers related to mechanical strength.

In addition, a second aspect of the present disclosure may provide a method for preparing a co-polyester resin, the method including: mixing $C_{2-5}$ aliphatic diol, isosorbide and dicarboxylic acid to perform an esterification reaction; and adding a catalyst and a thermal stabilizer to a compound produced in the esterification reaction to perform a condensation reaction.

In the method for preparing the co-polyester resin according to the second aspect of the present disclosure, the detailed description of the portions overlapping with the first aspect of the present disclosure is omitted, but even if the description is omitted, the description in the first aspect of the present disclosure may be equally applied to the second aspect of the present disclosure.

FIG. 1 is a flowchart of a method for preparing a co-polyester resin according to one embodiment of the present disclosure.

First of all, $C_{2-5}$ aliphatic diol, isosorbide and dicarboxylic acid may be mixed to perform an esterification reaction (S100).

The dicarboxylic acid may include $C_{2-6}$ aliphatic dicarboxylic acid and cyclic aromatic dicarboxylic acid.

As described above, the $C_{2-5}$ aliphatic diol and/or the $C_{2-6}$ aliphatic dicarboxylic acid may be a biodegradable material, and as the ratio of the aliphatic diol and/or the $C_{2-6}$ aliphatic dicarboxylic acid added is increased during a preparation process, the biodegradability of the prepared co-polyester resin may be improved while the mechanical strength may be deteriorated.

On the contrary, as the amount of the isosorbide and the cyclic aromatic dicarboxylic acid added is increased during the preparation process, the mechanical strength of the prepared co-polyester resin may be improved, while the biodegradability may be deteriorated.

Thus, in the esterification reaction, with regard to the $C_{2-5}$ aliphatic diol, the isosorbide, and the dicarboxylic acid, it may be very important to control a mixing ratio of the $C_{2-6}$ aliphatic dicarboxylic acid and the cyclic aromatic dicarboxylic acid so that the prepared copolymer may have excellent mechanical strength and biodegradability.

According to one embodiment of the present disclosure, the esterification reaction may be performed in a pressure range of 1.5 atm to 2.5 atm, but is not be limited thereto.

According to one embodiment of the present disclosure, the esterification reaction may be performed in a temperature range of 180° C. to 210° C., but is not be limited thereto.

Then, a catalyst and a thermal stabilizer may be added to a compound produced in the esterification reaction to perform a condensation reaction (S200).

According to one embodiment of the present disclosure, the catalyst may include titanium alkoxide, but is not be limited thereto.

For example, the catalyst may be titanium butoxide, but is not limited thereto.

According to one embodiment of the present disclosure, the thermal stabilizer may be selected from the group consisting of phosphorous acid, phosphoric acid, phosphorous ester, phosphate ester, and combinations thereof, but is not limited thereto.

According to one embodiment of the present disclosure, the condensation reaction may be performed in a pressure range of 0.5 torr to 1 torr, but is not be limited thereto.

According to one embodiment of the present disclosure, the condensation reaction may be performed in a temperature range of 230° C. to 260° C., but is not be limited thereto.

According to one embodiment of the present disclosure, the co-polyester resin may include a compound represented by formula 1 below, but is not limited thereto:

description is omitted, the description in the first aspect and/or second aspect of the present disclosure may be equally applied to the third aspect of the present disclosure.

Poly(butylene succinate) (PBS) and poly (lactic acid) (PLA), which are conventional biodegradable polymers, have relatively high strength compared to other biodegradable polymers, but have brittleness, and thus are easy to break, making it difficult to be applied to application fields such as films, fibers, and the like.

However, the co-polyester resin according to the present disclosure has excellent mechanical strength while having biodegradability, and thus can be applied to biodegradable films such as a packaging film, a food packaging container, a disposable envelope, and the like.

Furthermore, a fourth aspect of the present disclosure may provide a polyester fiber including the co-polyester resin according to the first aspect of the present disclosure.

In the polyester fiber according to the fourth aspect of the present disclosure, the detailed description of the portions overlapping with the first aspect and/or the second aspect of the present disclosure is omitted, but even if the description is omitted, the description in the first aspect and/or second aspect of the present disclosure may be equally applied to the fourth aspect of the present disclosure.

Poly-butylene adipate terephthalate (PBAT) and poly butylene succinate-co-adipate-co-terephthalate (PBSAT), which are conventional biodegradable polymers, have high elongation but low strength, and thus there is a problem in that the PBAT and PBSAT may not be used in application fields such as fishing net, fishing gear, and the like, requiring high-strength physical properties.

[Formula 1]

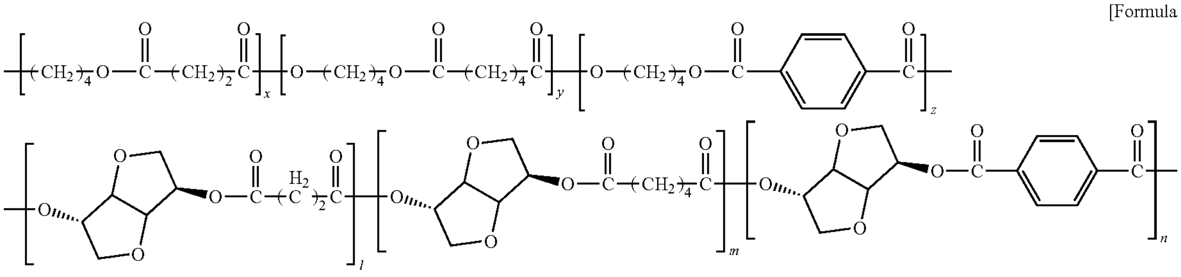

(wherein in above formula 1, x is 49 to 95, y is 2.5 to 21, and z is 2.5 to 21, l is 2.5 to 21, m is 0.05 to 9, and n is 0.05 to 9, and sum of x, y, z, l, m, and n is 100).

A co-polyester resin represented by above formula 1 may be prepared by the method for preparing a co-polyester resin according to the present disclosure, and the co-polyester resin may be a co-polyester resin prepared to have an optimum effect by controlling the ratio of a cyclic monomer capable of increasing strength and a monomer having biodegradability without losing the advantages of both. Thus, the co-polyester resin may maintain strength and durability higher than those of existing biodegradable plastics during a period of use, and bio-degrade after the period of use or when is discarded, thus causing no environmental problems.

In addition, a third aspect of the present disclosure may provide a biodegradable film including the co-polyester resin according to the first aspect of the present disclosure.

In the biodegradable film according to the third aspect of the present disclosure, the detailed description of the portions overlapping with the first aspect and/or the second aspect of the present disclosure is omitted, but even if the However, the co-polyester resin according to the present disclosure may have excellent mechanical strength while having biodegradability, and thus may be applied to polyester fibers such as threads, fishing nets, fishing gear, etc.

Hereinafter, the present invention will be described in more detail with reference to the following embodiments, but the following embodiments are for the purpose of description only and are not intended to limit the scope of the present disclosure.

[Example 1] Preparation of Co-Polyester Resin

First of all, 1541 g of 1,4-butanediol (BDO), 131.5 g of isosorbide (ISB), 1275 g of succinic acid (SA), 87.7 g of adipic acid (AA), and 99.7 g of terephthalic acid (TPA) were added to an esterification reactor (5 L), and ingredients were mixed to react while slowly increasing a temperature to 210° C. Water, which was the resulting by-product, was discharged to the outside and subjected to esterification reaction, and at least 90% of the resulting water was removed, after which a pre-polymer product was transferred to a condensation reactor (5 L) equipped with a stirrer, a cooling condenser, and a vacuum line.

To the esterified product was then added 6.71 g of titanium butoxide (TNBT) as a catalyst and 1.25 g of phosphorous acid as a thermal stabilizer. While an internal temperature of the reactor was increased to 230° C. to 260° C., the BDO, which was the reaction by-product, as well as an excessive amount of the BDO and ISB were removed in a low vacuum atmosphere of 0.1 torr or less.

The esterification reaction and the condensation reaction took two hours to complete each reaction.

FIG. 2 is an image of a co-polyester resin prepared according to one embodiment of the present disclosure.

Example 2

Example 2 was prepared in the same manner as Example 1, except that 1541 g of 1,4-butanediol (BDO), 131.5 g of isosorbide (ISB), 1346 g of succinic acid (SA), 99.7 g of terephthalic acid (TPA), 6.67 g of titanium butoxide (TNBT), and 1.24 g of phosphorous acid were added thereto.

Example 3

Example 3 was prepared in the same manner as Example 1, except that 1460 g of 1,4-butanediol (BDO), 263.1 g of isosorbide (ISB), 1275 g of succinic acid (SA), 87.7 g of adipic acid (AA), 99.7 g of terephthalic acid (TPA), 6.81 g of titanium butoxide (TNBT), and 1.27 g of phosphorous acid were added thereto.

Example 4

Example 4 was prepared in the same manner as Example 1, except that 1460 g of 1,4-butanediol (BDO), 263.1 g of isosorbide (ISB), 1346 g of succinic acid (SA), 99.7 g of terephthalic acid (TPA), 6.76 g of titanium butoxide (TNBT), and 1.26 g of phosphorous acid were added thereto.

Example 5

Example 5 was prepared in the same manner as Example 1, except that 1606 g of 1,4-butanediol (BDO), 26.3 g of isosorbide (ISB), 1275 g of succinic acid (SA), 87.7 g of adipic acid (AA), 99.7 g of terephthalic acid (TPA), 6.65 g of titanium butoxide (TNBT), and 1.24 g of phosphorous acid were added thereto.

Example 6

Example 6 was prepared in the same manner as Example 1, except that 1606 g of 1,4-butanediol (BDO), 26.3 g of isosorbide (ISB), 1346 g of succinic acid (SA), 99.7 g of terephthalic acid (TPA), 6.67 g of titanium butoxide (TNBT), and 1.24 g of phosphorous acid were added thereto.

Example 7

Example 7 was prepared in the same manner as Example 1, except that 1573 g of 1,4-butanediol (BDO), 78.9 g of isosorbide (ISB), 1275 g of succinic acid (SA), 87.7 g of adipic acid (AA), 99.7 g of terephthalic acid (TPA), 6.70 g of titanium butoxide (TNBT), and 1.25 g of phosphorous acid were added thereto.

Example 8

Example 8 was prepared in the same manner as Example 1, except that 1573 g of 1,4-butanediol (BDO), 78.9 g of isosorbide (ISB), 1346 g of succinic acid (SA), 99.7 g of terephthalic acid (TPA), 6.71 g of titanium butoxide (TNBT), and 1.26 g of phosphorous acid were added thereto.

Comparative Example 1

Comparative Example 1 was prepared in the same manner as Example 1, except that 1622 g of 1,4-butanediol (BDO), 877 g of adipic acid (AA), 997 g of terephthalic acid (TPA), 7.79 g of titanium butoxide, and 1.45 g of phosphorous acid were added thereto.

Comparative Example 1 is a commercially produced polymer and is called poly(butylene adipate terephthalate) (PBAT).

Comparative Example 2

Comparative Example 1 was prepared in the same manner as Example 1, except that 1622 g of 1,4-butanediol (BDO), 1275 g of succinic acid (SA), 87.7 g of adipic acid (AA), 99.7 g of terephthalic acid (TPA), 6.62 g of titanium butoxide, and 1.23 g of phosphorous acid were added thereto.

The polymer of Comparative Example 2 is called poly (butylene adipate terephthalate) (PBSAT).

Table 1 below shows the composition and molecular weight of the resin according to one Example and Comparative Examples of the present disclosure. Specifically, among the BDO, ISB, SA, AA, and TPA included in each resin of which the synthesis is completed, the BDO and ISB were used as the diol parts and the SA, AA, and TPA were used as the dicarboxylic acid parts, and the content ratio included in each part was represented by mol %. For example, in the case of Example 1, the diol parts BDO and ISB were included at a molar ratio of 95:5, and the dicarboxylic acid parts SA, AA, and TPA were included at 90:5:5.

TABLE 1

| | Example 5 | Example 6 | Example 7 | Example 8 | Example 1 | Example 2 | Example 3 | Example 4 | Comparative Example 1 | Comparative Example 2 |
|---|---|---|---|---|---|---|---|---|---|---|
| BDO | 99 | 99 | 97 | 97 | 95 | 95 | 90 | 90 | 100 | 100 |
| ISB | 1 | 1 | 3 | 3 | 5 | 5 | 10 | 10 | 0 | 0 |
| SA | 90 | 95 | 90 | 95 | 90 | 95 | 90 | 95 | 0 | 90 |
| AA | 5 | 0 | 5 | 0 | 5 | 0 | 5 | 0 | 50 | 5 |
| TPA | 5 | 5 | 5 | 5 | 5 | 5 | 5 | 5 | 50 | 5 |
| Molecular weight (Mw) | 147,500 | 147,800 | 147,700 | 148,000 | 148,000 | 147,000 | 149,000 | 148,500 | 130,000 | 150,300 |

Experimental Example 1

An experiment for measuring thermal and mechanical properties of one Example and Comparative Examples of the present disclosure was performed as follows:

A glass transition temperature (Tg) was measured by differential scanning calorimetry (DSC) performed using TA Q20 for about 10 mg of samples under a nitrogen atmosphere at a heating rate of 10° C./min;

A melting temperature (Tm) was measured by differential scanning calorimeter (DSC) performed using TA Q20 for about 10 mg of samples under a nitrogen atmosphere at a heating rate of 10° C./min;

A denitrification temperature (Td) was performed using a TA Q50 thermogravimetric analyzer for 7 mg to 10 mg of samples under a nitrogen atmosphere at a heating rate of 10° C./min; and After a specimen (dog bone type) was prepared, INSTRON E3000, which is a universal testing machine (UTM), was used as a tensile speed of 50 mm/min for Young's modulus, elongation, and tensile strength.

A melt flow index was measured at 2.16 kg and 190° C. by using a melt flow index machine.

Table 2 below shows a result of measuring thermal properties of the resins according to one Example and Comparative Examples of the present disclosure.

TABLE 2

| | Example 1 | Example 2 | Example 3 | Example 4 | Comparative Example 1 | Comparative Example 2 |
|---|---|---|---|---|---|---|
| Glass transition temp. ($T_g$,° C.) | −31.1 | −27.4 | −28.5 | −25.0 | −42.4 | −34.2 |
| Melting temp. ($T_m$,° C.) | 101 | 106 | 92.7 | 103 | 110 | 106 |
| Heat of fusion ($\Delta H_m$, J/g) | 52.3 | 59.0 | 40.8 | 56.0 | 8.9 | 57.2 |
| Initial degradation temp. ($T_{5\%}$,° C.) | 366 | 354 | 363 | 349 | 391 | 370 |
| Degradation temp. ($T_d$, ° C.) | 440 | 426 | 435 | 420 | 432 | 440 |
| Melt flow Index (g/10 min) | 5.61 | 5.63 | 5.71 | 5.68 | 6.45 | 5.57 |

Referring to above table 2, it may be observed that as an ISB content included in the polymer is increased, a glass transition temperature is higher, that is, the glass transition temperatures of Examples 1 and 2 having the ISB content of 5% are higher than those of Comparative Examples 1 and 2 having the ISB content of 0%, and the glass transition temperatures of Examples 3 and 4 having the ISB content of 10% are higher than those of Examples 1 and 2 having the ISB content of 5%, As a result, according to Experimental Example 1 of the present application, it may be proved that as the ISB content is increased, the thermal stability of the polymer becomes more excellent.

Meanwhile, in the case of Examples 3 and 4 having the ISB content of 10%, it may be observed that the melting temperature (Tm) is reduced compared to Examples 1 and 2 having the ISB content of 5%. This may be because when the ISB content is 10%, crystallinity in the polymer is decreased as the irregularity of a molecular structure is increased.

Meanwhile, in the case of Example 2, it can be seen that the glass transition temperature, the melting temperature, and the heat of fusion are all higher than those of Example 1 while maintaining a degree of crystallinity. This may be because AA is included in Example 1. In a polymer structure, the AA may increase elongation, but may reduce brittleness to improve flexibility, but may not increase crystallinity.

Through the experiment of the present application, the formation of crystals in the polymer structure by the ISB may increase the strength of the polymer, which may be verified through the highest strength in Example 2. Thus, it may be found that the ISB content of 5% according to Example 2 has critical significance.

Table 3 below shows a result of measuring mechanical properties of the resins according to one Example and Comparative Examples of the present disclosure.

TABLE 3

| | Example 5 | Example 6 | Example 7 | Example 8 | Example 1 | Example 2 | Example 3 | Example 4 | Comparative Example 1 | Comparative Example 2 |
|---|---|---|---|---|---|---|---|---|---|---|
| Young's Modulus.(MPa) | 252 | 257 | 251 | 270 | 250 | 328 | 215 | 260 | 210 | 252 |
| Elongation(%) | 703 | 705 | 660 | 610 | 660 | 520 | 711 | 670 | 870 | 714 |
| Tensile Strength(MPa) | 38.4 | 40.9 | 37.5 | 43.5 | 37.2 | 49.3 | 34 | 37 | 27 | 39.4 |

Referring to above table 3, it may be seen that, when the contents of isosorbide are sequentially increased to 0, 1, 3, and 5% according to Comparative Example 2, Example 6, Example 8, and Example 2, Young's modulus and tensile strength are increased. More specifically, through Experimental Example 1, it can be confirmed that in Example 2 having the isosorbide content of 5%, the Young's modulus is increased 56% and the tensile strength is increased 83% compared to Comparative Example 1, and it can be confirmed that the Young's modulus is increased 30% and the tensile strength is increased 25% compared to Comparative Example 2.

Meanwhile, it can be seen that, when the content of isosorbide exceeds 5% and is increased to 10% according to Example 4, the Young's modulus and tensile strength are further decreased in Example 2. Accordingly, it can be seen that the strength is not simply increased as the content of isosorbide is increased, and it may be found that the ISB content of 5% according to Example 2 has critical significance.

As described above, a monomer related to strength and a monomer related to biodegradability have a trade-off relationship, and thus when a specific ratio is not adjusted, a degree of crystallinity may be decreased and thus the strength may be decreased. Considering the above, it can be confirmed that the co-polyester resin needs to be prepared at an optimal synthesis ratio to achieve high strength and biodegradability FIG. 3 is a graph for describing biodegradability of a co-polyester resin prepared according to one embodiment of the present application.

In order to measure biodegradable properties, the co-polyester resins according to Example 2 and Comparative Example 2 were prepared in the form of sheet by putting sample pellets into a mold with a 1 mm gap and thermally compressing the same in a hot press at 140° C.

FIG. 3 shows a result of measuring the biodegradable properties of the co-polyester resins prepared according to Example 2 and Comparative Example 2 by a biodegradable test method according to ISO 14855-1 (2005). For the biodegradability test, a 10 cm×10 cm×1 mm specimen was placed at compost under compost pH 7.0 environment at 60° C. and humidity of 95% or more, and the concentration of carbon dioxide, which was discharged as the specimen was decomposed, was measured. At this time, a degree of biodegradability was measured using a gas chromatograph.

Referring to table 1 described above, Example 2 of the present application may include 5% of isosorbide (ISB) unlike Comparative Example 2, and Comparative Example 2 may include 5% of adipic acid (AA) unlike Example 2. Here, Comparative Example 2 may be a PBSAT polymer conventionally known as a biodegradable resin.

Referring to FIG. 3, it can be seen from Example 2 and Comparative Example 2 that a degree of biodegradability is very similar until the 20th day and a difference in the degree of biodegradability from the 20th day to the 45th day is about 5%, indicating that the degree of biodegradability is also similar.

This may be because the isosorbide (ISB) included in Example 2 may have a structure in which biodegradation occurs, but include a cyclic structure, and thus has a moisture absorption rate lower than AA including a linear structure.

Accordingly, it can be proved that introduction of isosorbide (ISB) according to the experiment of the present application improves thermal stability and strength of the polymer while maintaining the biodegradability of the polymer material.

The above description of the present disclosure is for illustrative purposes, and those of ordinary skill in the art to which the present disclosure pertains will understand that the present disclosure may be easily modified into other specific forms without changing the technical idea or essential features of the present disclosure. Thus, it should be understood that the exemplary embodiments described above are illustrative in all aspects and are not contrived to limit the scope of the present invention. For example, each element described as a single form may be distributed and implemented, and similarly, the elements described as being distributed may be implemented in a combined form.

It should be understood that the scope of the present disclosure includes all the modifications or changed forms derived from the meaning and scope of the patent claims to be described below as well as equivalents thereto, rather than the detailed descriptions above.

What is claimed is:

1. A co-polyester resin comprising dicarboxylic acid, wherein the co-polyester resin includes $C_{2-5}$ aliphatic diol and isosorbide in an amount of 70 mol to 97.5 mol and 2.5 mol to 30 mol, respectively, based on 100 mol of the dicarboxylic acid, and the dicarboxylic acid includes $C_{2-6}$ aliphatic dicarboxylic acid and cyclic aromatic dicarboxylic acid, wherein the co-polyester resin comprises a compound represented by formula 1 below:

[Formula 1]

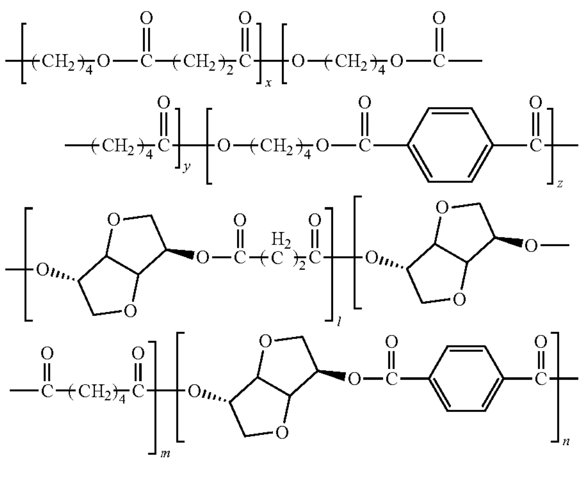

(wherein in above formula 1, x is 49 to 95, y is 2.5 to 21, and z is 2.5 to 21, l is 2.5 to 21, m is 0.05 to 9, and n is 0.05 to 9, and a sum of x, y, z, l, m, and n is 100).

2. The co-polyester resin of claim 1, wherein biodegradability is increased as a content of the $C_{2-5}$ aliphatic diol and/or the $C_{2-6}$ aliphatic dicarboxylic acid is increased.

3. The co-polyester resin of claim 1, wherein mechanical strength is increased as a content of the isosorbide and/or the cyclic aromatic dicarboxylic acid is increased.

4. The co-polyester resin of claim 3, wherein the isosorbide is comprised in an amount of greater than 3 mol to less than 10 mol.

5. The co-polyester resin of claim 1, wherein the dicarboxylic acid comprises the $C_{2-6}$ aliphatic dicarboxylic acid and the cyclic aromatic dicarboxylic acid at a molar ratio of 70:2.5 to 97.5:30.

6. A biodegradable film comprising a co-polyester resin according to claim 1.

7. A polyester fiber comprising a co-polyester resin according to claim 1.

8. A method for preparing a co-polyester resin, the method comprising:

mixing $C_{2-5}$ aliphatic diol, isosorbide and dicarboxylic acid to perform an esterification reaction; and adding a catalyst and a thermal stabilizer to a compound produced in the esterification reaction to perform a condensation reaction, wherein the co-polyester resin comprises a compound represented by formula 1 below:

[Formula 1]

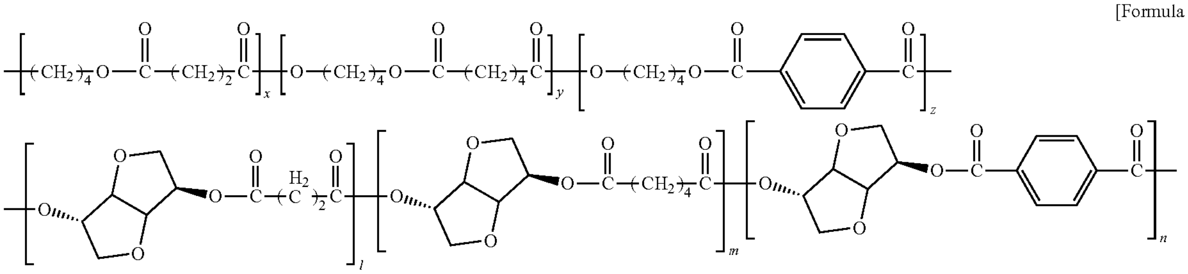

(wherein in above formula 1, x is 49 to 95, y is 2.5 to 21, and z is 2.5 to 21, l is 2.5 to 21, m is 0.05 to 9, and n is 0.05 to 9, and sum of x, y, z, l, m, and n is 100).

9. The method of claim 8, wherein the catalyst comprises titanium alkoxide.

10. The method of claim 8, wherein the thermal stabilizer is selected from the group consisting of phosphorous acid, phosphoric acid, phosphorous ester, phosphate ester, and combinations thereof.

11. The method of claim 8, wherein the esterification reaction is performed in a pressure range of 1.5 atm to 2.5 atm.

12. The method of claim 8, wherein the esterification reaction is performed in a temperature range of 180° C. to 210° C.

13. The method of claim 8, wherein the condensation reaction is performed in a pressure range of 0.5 torr to 1 torr.

14. The method of claim 8, wherein the condensation reaction is performed in a temperature range of 230° C. to 260° C.

* * * * *